(12) United States Patent
Kuroda

(10) Patent No.: US 7,652,688 B2
(45) Date of Patent: Jan. 26, 2010

(54) IMAGING APPARATUS AND ZOOM LENS WITH A SHIFT LENS GROUP

(75) Inventor: Daisuke Kuroda, Kanagawa (JP)

(73) Assignee: Sony Corporation, Tokyo (JP)

( * ) Notice: Subject to any disclaimer, the term of this patent is extended or adjusted under 35 U.S.C. 154(b) by 450 days.

(21) Appl. No.: 11/790,338

(22) Filed: Apr. 25, 2007

(65) Prior Publication Data

US 2007/0285520 A1  Dec. 13, 2007

(30) Foreign Application Priority Data

May 9, 2006 (JP) .............................. 2006-130531
Jun. 14, 2006 (JP) .............................. 2006-164904

(51) Int. Cl.
H04N 5/228 (2006.01)
H04N 5/225 (2006.01)
G02B 27/64 (2006.01)

(52) U.S. Cl. .................. 348/208.11; 348/335; 359/554

(58) Field of Classification Search ................. 348/335, 348/338, 340, 344, 208.4, 208.7, 208.8, 208.11; 359/554, 555, 556, 557, 676, 683
See application file for complete search history.

(56) References Cited

U.S. PATENT DOCUMENTS

| | | | | |
|---|---|---|---|---|
| 4,911,539 A * | 3/1990 | Tsunashima et al. | ........ | 359/676 |
| 5,416,558 A * | 5/1995 | Katayama et al. | ............. | 396/52 |
| 6,424,465 B2 * | 7/2002 | Suzuki | ........................ | 359/557 |
| 6,498,687 B1 * | 12/2002 | Sekita et al. | ................ | 359/680 |
| 6,587,280 B2 * | 7/2003 | Horiuchi | ..................... | 359/684 |
| 6,751,028 B1 * | 6/2004 | Horiuchi | ..................... | 359/687 |
| 7,218,457 B2 * | 5/2007 | Sensui | ........................ | 359/686 |

FOREIGN PATENT DOCUMENTS

| JP | 2000-131610 A | 5/2000 |
|---|---|---|
| JP | 2005-181635 | 7/2005 |

* cited by examiner

*Primary Examiner*—Jason Chan
*Assistant Examiner*—Nicholas G Giles
(74) *Attorney, Agent, or Firm*—Rader, Fishman & Grauer PLLC

(57) ABSTRACT

A zoom lens including a plurality of lens groups and varying magnification by changing a distance between lens groups, wherein a last lens group positioned on an image side closest thereto with a negative part group having negative refractive power and a positive part group arranged adjacent on the image side thereof and having positive refractive power, wherein the positive part group is shifted in a direction vertical to an optical axis to shift an image, and Equations (1) and (2) are satisfied, $$-0.30 < fgn/(Ngn \cdot fT) < -0.05 \quad (1)$$

$$vgn - vgis > 30 \quad (2)$$

where, fgn: focal length of the negative part group, Ngn: average refractive index of the negative part group, fT: focal length of the entire system at a telephoto end, vgn: composite Abbe number of the negative part group, and vgis: composite Abbe number of the positive part group.

8 Claims, 13 Drawing Sheets

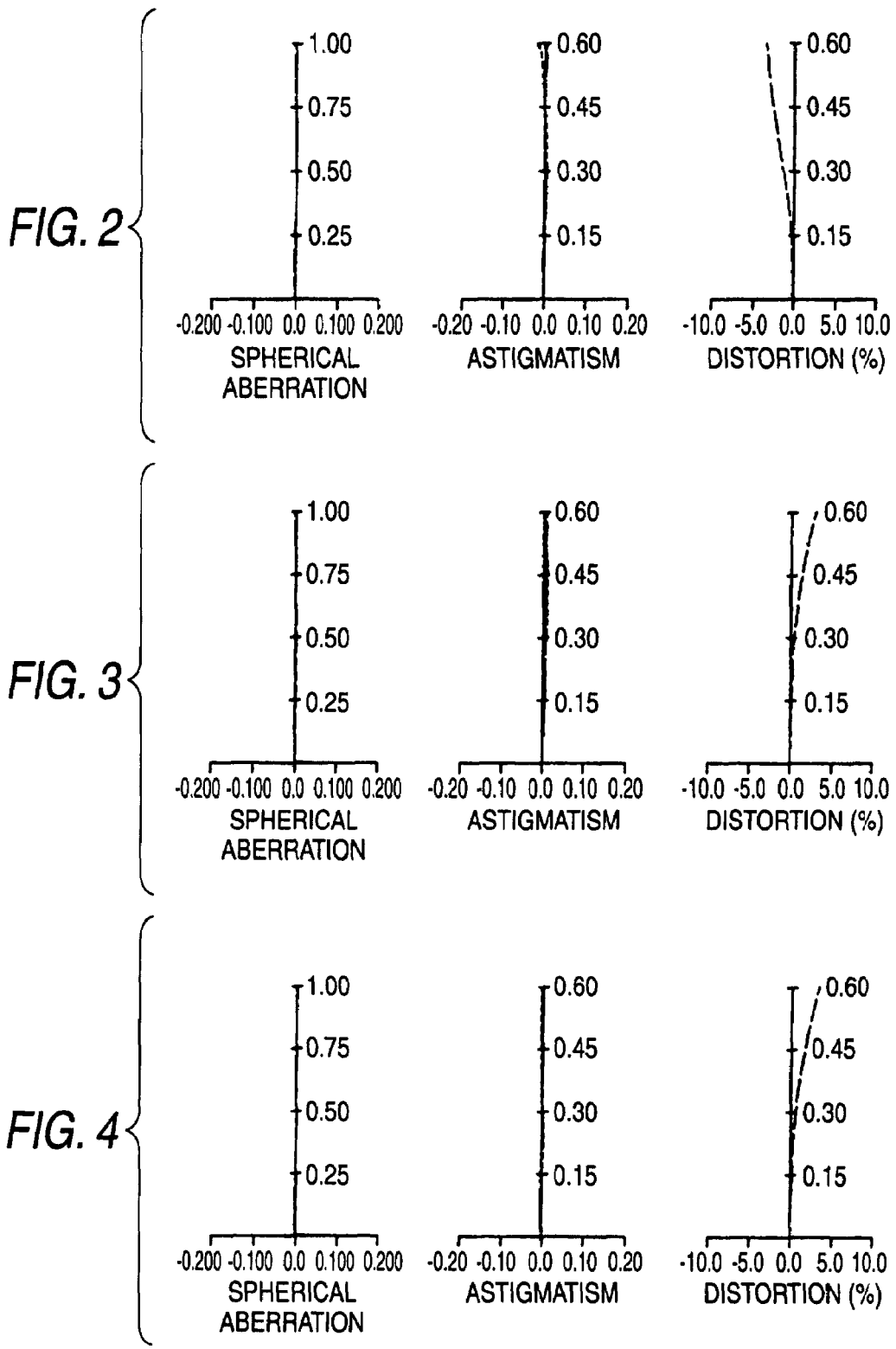

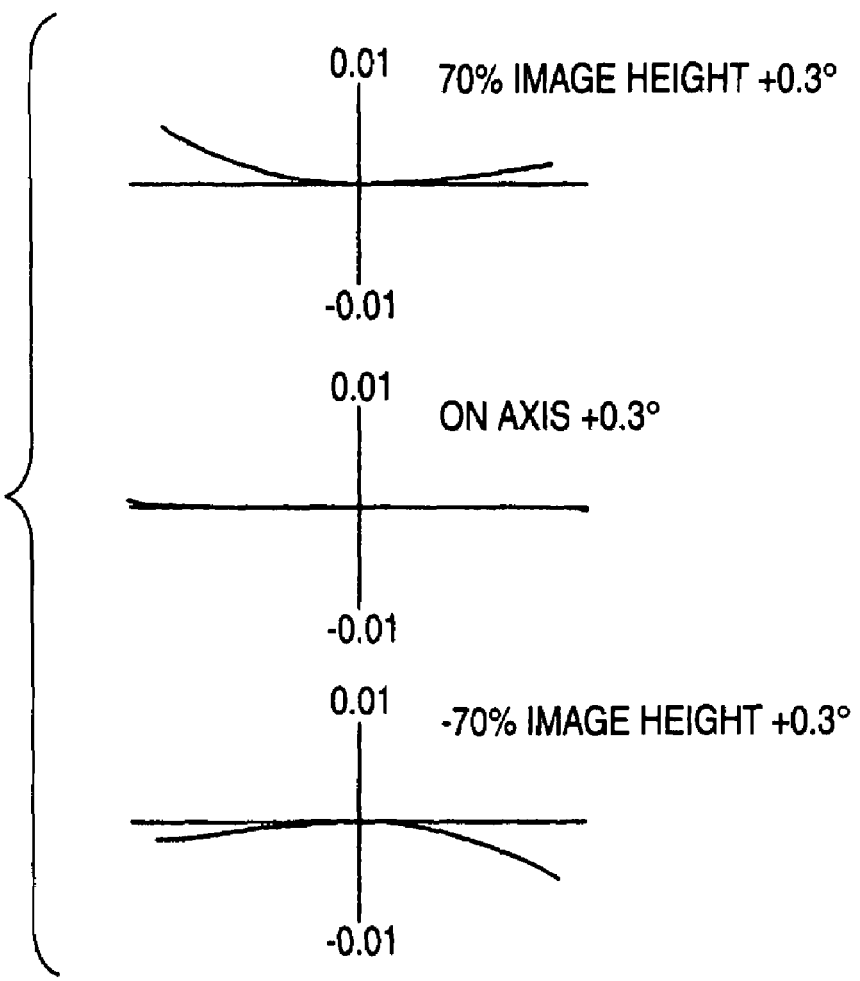

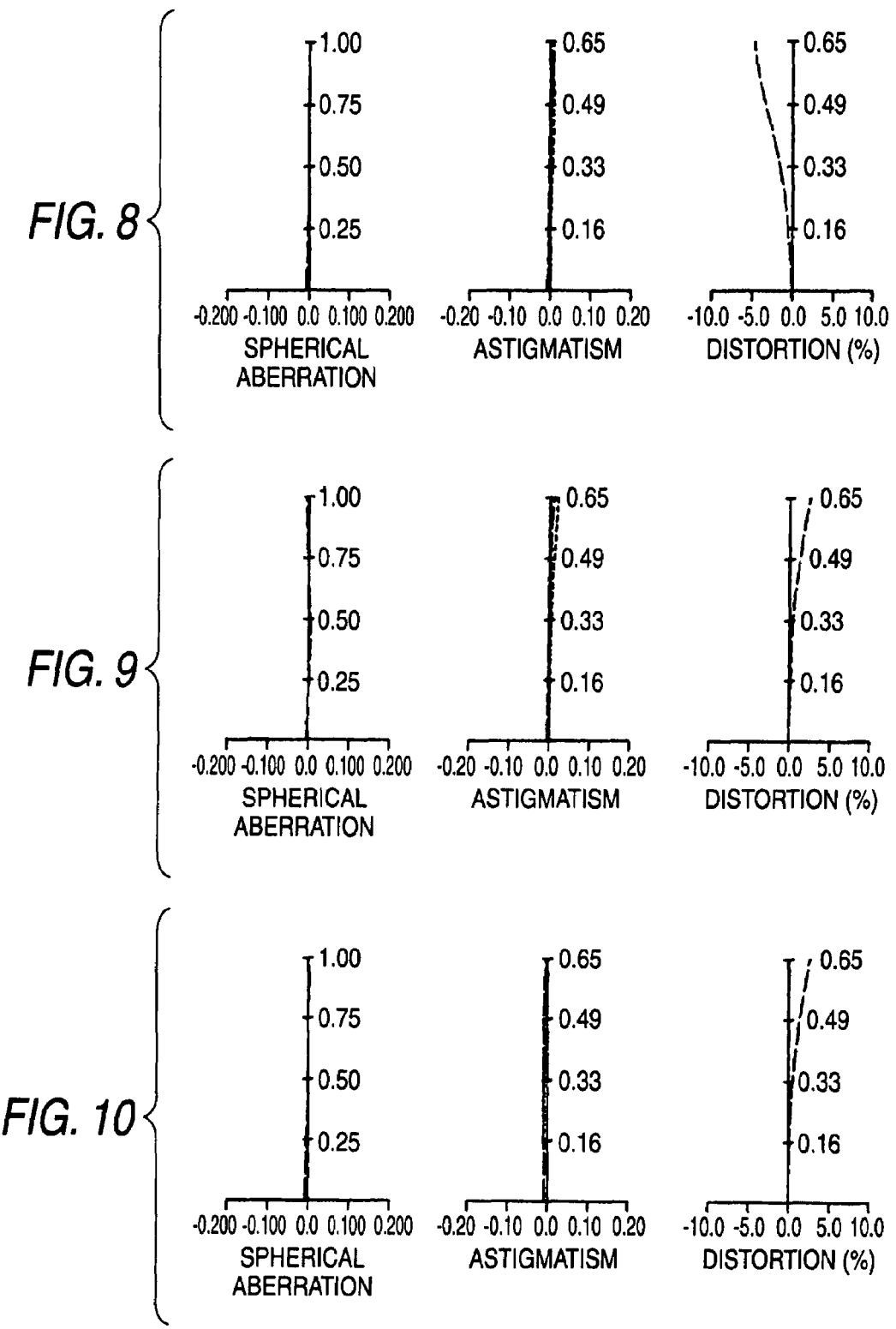

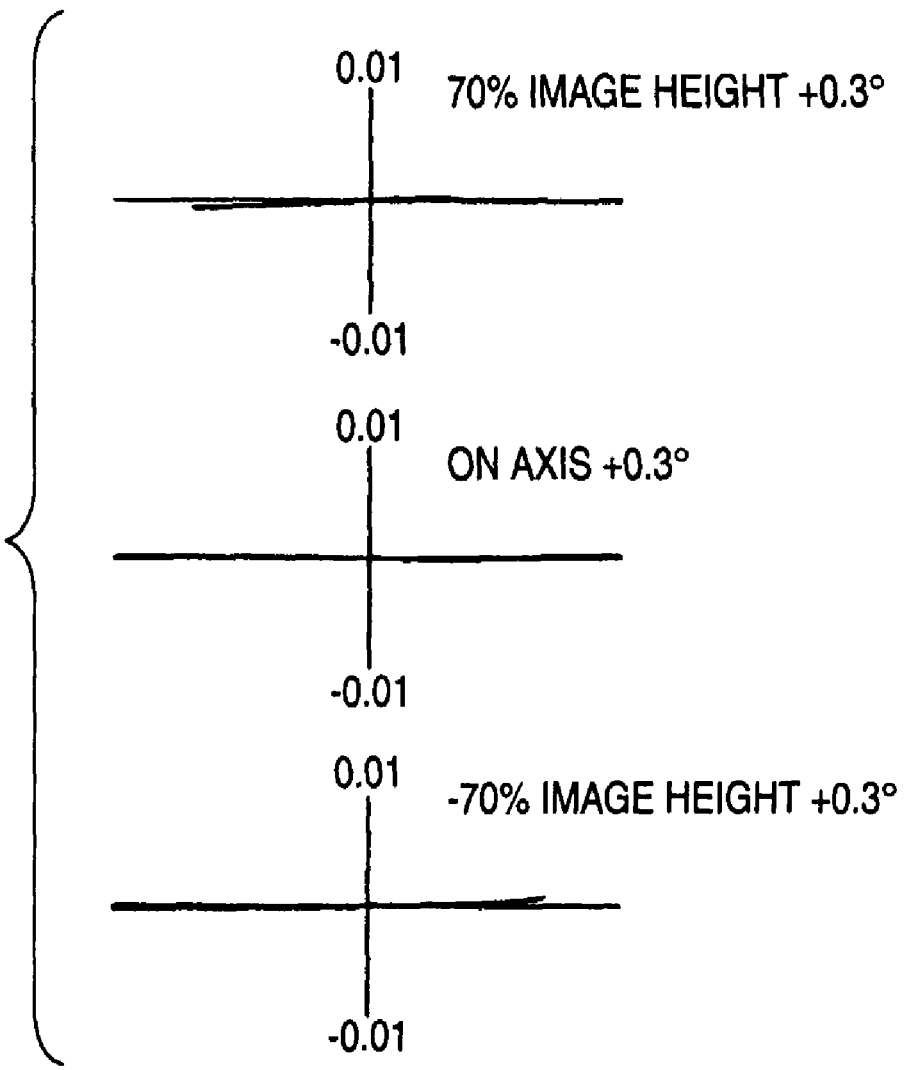

IMAGING APPARATUS AND ZOOM LENS WITH A SHIFT LENS GROUP

CROSS REFERENCES TO RELATED APPLICATIONS

The present invention contains subject matter related to Japanese Patent Applications JP 2006-130531 and JP 2006-164904 filed in the Japanese Patent Office on May 9, 2006 and Jun. 14, 2006, respectively, the entire contents of which being incorporated herein by reference.

BACKGROUND OF THE INVENTION

1. Field of the Invention

The present invention relates to an inventive zoom lens and imaging apparatus. More specifically, the invention relates to a stabilized zoom lens in a small size which has about 4× magnification or greater suitable for use in a compact digital camera, and to an imaging apparatus which uses the stabilized zoom lens.

2. Description of the Related Art

In recent years, an imaging apparatus, such as a digital still camera, using a solid state imaging device is widely spreading. With the widespread use of such a digital still camera, it is demanded to create higher quality images. Particularly in a digital still camera with a large number of pixels, such a lens is desired; i.e. a taking lens with excellent image forming performance conforming to a solid state imaging device having a large number of pixels, particularly a thin zoom lens.

On the other hand, as an adverse effect of an imaging apparatus reduced in thickness and an imaging device with a large number of pixels, such a problem arises that an image tends to blur in taking a picture. An increasing demand is a high magnification zoom lens provided with a function of image stabilization.

In a zoom lens described in JP-A-2000-131610 (Patent Reference 1), such a digital still camera can be implemented that has a thickness of about 10 mm with about 3× optical magnification in which a prism that bends an optical path is inserted into an optical system to intend a reduction in size in the axial direction of incident light, that is, a reduction in thickness.

In addition, in a zoom lens described in JP-A-2005-181635 (Patent Reference 2), a second lens group, which is a variable magnification group, is configured of four lenses to achieve high variable magnification.

SUMMARY OF THE INVENTION

However, the zoom lens described in Patent Reference 1 has a zoom ratio of about 3× magnification with no scheme for stabilization, which cannot meet the demand for a stabilized zoom lens having about 4× magnification or greater with the stabilization function.

In addition, the zoom lens described in Patent Reference 2, achieves a reduction in thickness and high variable magnification, but it is not a stabilized zoom lens, having a problem that the total length is not reduced enough.

It is desirable therefore to provide a zoom lens which achieves both high variable magnification and a reduction in overall length while maintaining reduced thickness as well as provides a function of image stabilization, and an imaging apparatus using the zoom lens.

A zoom lens according to an embodiment of the invention is a zoom lens configured of a plurality of lens groups to change a distance between lens groups to vary magnification, the zoom lens including: a last lens group which is positioned on an image side closest thereto and has a negative part group having negative refractive power and a positive part group arranged adjacent on the image side thereof and having positive refractive power, wherein the positive part group is shifted in a direction vertical to an optical axis to shift an image, and Equations (1) and (2) are satisfied, where the equations are conditional, $$-0.30 < fgn/(Ngn \cdot fT) < -0.05 \quad (1)$$

$$vgn - vgis > 30 \quad (2)$$

where, fgn: a focal length of the negative part group in the last lens group, Ngn: an average refractive index of the negative part group in the last lens group, fT: a focal length of the entire system at a telephoto end, vgn: a composite Abbe number of the negative part group in the last lens group, and vgis: a composite Abbe number of the positive part group in the last lens group.

In addition, an imaging apparatus according to an embodiment of the invention is an imaging apparatus including a zoom lens, and an imaging device which converts an optical image formed by the zoom lens into an electric signal, the imaging apparatus including: a camera shake detecting means operable to detect a motion of the imaging apparatus; a camera shake control means operable to compute a motion compensation angle for compensating image fluctuations caused by the motion of the imaging apparatus detected by the camera shake detecting means and to send a drive signal so that a shift lens group in the zoom lens is placed at a position based on the motion compensation angle; and a drive part operable to shift the shift lens group in a direction vertical to an optical axis based on the drive signal, wherein the zoom lens is configured of a plurality of lens groups to change a distance between lens groups to vary magnification, and a last lens group positioned on an image side closest thereto has a negative part group having negative refractive power and a positive part group arranged adjacent on the image side thereof and having positive refractive power, wherein the positive part group is shifted in a direction vertical to an optical axis to shift an image, Equations (1) and (2) are satisfied, where the equations are conditional, $$-0.30 < fgn/(Ngn \cdot fT) < -0.05 \quad (1)$$

$$vgn - vgis > 30 \quad (2),$$

and the positive part group in the last lens group of the zoom lens is the shift lens group.

According to an embodiment of the invention, it can achieve both a reduction in thickness and high variable magnification as well as provide a function of image stabilization.

BRIEF DESCRIPTION OF THE DRAWINGS

FIG. 2 shows diagrams depicting various aberrations of a numeric example 1 in which specific numeric values are adapted to the zoom lens according to the first embodiment of the invention along with FIGS. 3 to 6, showing longitudinal aberrations (spherical aberration, astigmatism, and distortion) at a short focal length end;

FIG. 3 shows diagrams depicting longitudinal aberrations (spherical aberration, astigmatism, and distortion) at a medium focal length;

FIG. 4 shows diagrams depicting longitudinal aberrations (spherical aberration, astigmatism, and distortion) at a long focal length end;

FIG. 5 shows diagrams depicting transverse aberrations at a short focal length end, showing from above, when image fluctuations are compensated in 70% image height at an angle of 0.3°, when image fluctuations are compensated at the axial center at an angle of 0.3°, and when image fluctuations are compensated in −70% image height at an angle of 0.3°;

FIG. 8 shows diagrams depicting various aberrations of a numeric example 2 in which specific numeric values are adapted to the zoom lens according to the second embodiment of the invention, showing longitudinal aberrations (spherical aberration, astigmatism, and distortion) at a short focal length end along with FIGS. 9 to 12;

FIG. 9 shows diagrams depicting longitudinal aberrations (spherical aberration, astigmatism, and distortion) at a medium focal length;

FIG. 10 shows diagrams depicting longitudinal aberrations (spherical aberration, astigmatism, and distortion) at a long focal length end;

FIG. 11 shows diagrams depicting transverse aberrations at a short focal length end, showing from above, when image fluctuations are compensated in 70% image height at an angle of 0.3°, when image fluctuations are compensated at the axial center at an angle of 0.3°, and when image fluctuations are compensated in −70% image height at an angle of 0.3°;

DETAILED DESCRIPTION OF THE INVENTION

Figure 1:
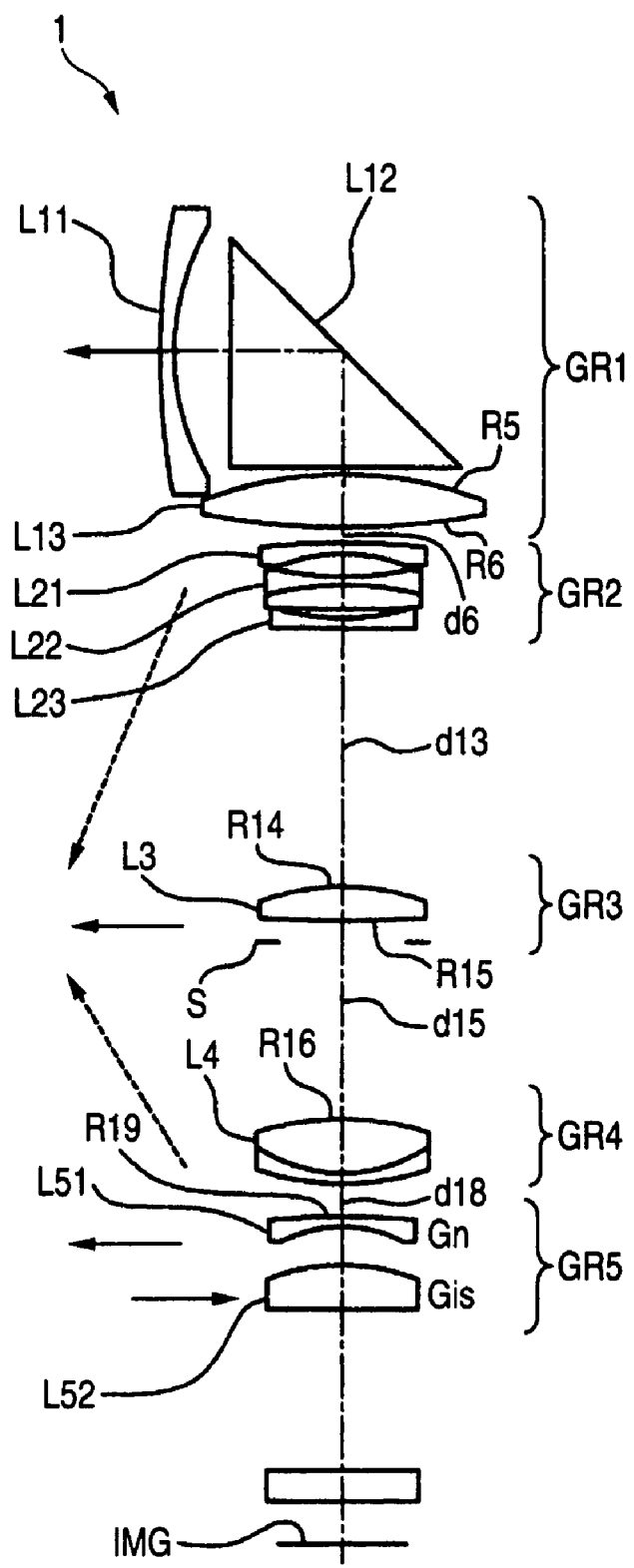
FIG. 1 shows a diagram depicting the lens configuration of a zoom lens according to a first embodiment of the invention.

Hereinafter, best modes of carrying out a zoom lens and an imaging apparatus according to embodiments of the invention will be described with reference to the drawings and tables.

First, a zoom lens will be described.

The zoom lens according to an embodiment of the invention is configured of a plurality of lens groups, which is a zoom lens that changes the distance between the lens groups to vary magnification. A last lens group positioned on the image side closest thereto has a negative part group having negative refractive power and a positive part group arranged adjacent on the image side thereof and having positive refractive power, which can shift the positive part group in the direction vertical to the optical axis to shift an image. Moreover, it satisfies the following Equations (1) and (2), where these equations are conditional.

$$-0.30 < fgn/(Ngn \cdot fT) < -0.05 \qquad (1)$$

$$vgn - vgis > 30 \qquad (2)$$

Where, fgn: a focal length of the negative part group in the last lens group,

Ngn: an average refractive index of the negative part group in the last lens group, fT: a focal length of the entire system at the telephoto end, vgn: a composite Abbe number of the negative part group in the last lens group, and vgis: a composite Abbe number of the positive part group in the last lens group.

With the configuration above, the zoom lens according to an embodiment of the invention can achieve high magnification and a reduction in size, and provides the function of camera stabilization as well. Moreover, the negative part group and the positive part group are in turn arranged in the last lens group to allow a gentle incident angle into an imaging device, which is most suitable for an imaging apparatus having an imaging device using a photoelectric conversion element such as a CCD (Charge Coupled Device) and a CMOS (Complementary Metal-Oxide Semiconductor).

A Petzval sum P of each of the lens groups is expressed by the following equation.

$$P = f/N$$

Where, f is the focal length of the lens, and N is the refractive index of the lens.

From the discussion above, when the Petzval sum Pn of the negative part group in the last lens group is determined, it results in Pn=fgn/Ngn. The following is obtained, where Pntele is that Pn=fgn/Ngn is standardized in the focal length at the telephoto end.

$$Pntele = fgn/(Ngn \cdot fT)$$

In other words, Equation (1) is that the Petzval sum of the negative part group in the last lens group is standardized in the focal length at the telephoto end.

When it is intended to provide high magnification to the overall lens and to reduce throughout the length, the Petzval sum of the entire system tends to be positive, and it is necessary that the negative part group has a greater Petzval sum in order to compensate the tendency in the entire system.

More specifically, the value of fgn/(Ngn·fT) exceeds −0.05, it is difficult to compensate the Petzval sum in the entire lens system, causing a difficulty to achieve both the provision of high variable magnification and a reduction in size of the entire lens system. In addition, when the value of fgn/(Ngn·fT) is below −0.30, contrary to this, the Petzval sum is over compensated, which is not preferable for compensating aberration. Particularly, when specialized for the provision of high power and a reduction in size, it is most efficient to use the values near −0.2<fgn/(Ngn·fT)<−0.1. In this case, the provision of high power and image forming performance, and a reduction in size are all satisfied.

Equation (2) defines the difference of the composite Abbe numbers between the negative part group and the positive part group arranged adjacent on the image side thereof in the last lens group. More specifically, when the value of vgn−vgis is below 30, it is not preferable because the fluctuation in magnification chromatic aberration is too great in keeping a camera steady.

In addition, the composite Abbe number vd is given on the axis near the optical axis as below. For example, in the case of positive and negative cemented lenses, it is given by:

$$vd=1/f((f1·f2·v1·v2)/(f1·v1+f2·v2))$$

where f1 is the positive focal length of the lens, f2 is the negative focal length of the lens, v1 is the Abbe number of the positive lens, v2 is the Abbe number of the negative lens, and f is the focal length of the cemented lens.

Desirably, a zoom lens according to an embodiment of the invention is configured of a negative meniscus single lens in which the negative part group in the last lens group has a convex surface facing on the object side having negative refractive power, which satisfies Equation (3) below, where the equation is conditional.

$$Ngn>1.80 \quad (3)$$

Suppose a lens that configures the negative part group is a meniscus lens whose concave surface faces on the object side, the spherical aberration that occurs in the concave surface is great, and it is difficult to compensate the aberration in the entire lens system.

Equation (3) defines the refractive index of the negative part group in the last lens group. More specifically, when Ngn is below 1.80, the refractive power of the negative part group becomes strong in order to compensate the Petzval sum of the entire lens system. Consequently, the balance of compensating the spherical aberration is not maintained, causing degraded image forming performance or an increase in size of the lens.

Desirably, a zoom lens according to an embodiment of the invention is configured of a single lens or a single cemented lens in which the positive part group in the last lens group has positive refractive power, which satisfies Equation (4) below, where the equation is conditional and fgis is the focal length of the positive part group in the last lens group.

$$0.3<fgis/fT<1.2 \quad (4)$$

Since the stabilization group is configured of a number of lenses to apply a great load to a drive mechanism in keeping a camera steady, desirably, the positive part group is configured of a single lens or a single cemented lens.

In addition, when the variable magnification ratio is five times or greater, the fluctuation in magnification chromatic aberration tends to be large in keeping camera steady. More desirably, the positive part group having the positive refractive power is configured of a double-convex lens having positive refractive power and a cemented lens of a negative meniscus lens in which the concave surface faces on the object side having negative refractive power.

In addition, when the positive part group is configured of a plastic lens, it can contribute to electric power saving because the plastic lens can be reduced in weight while being less expensive than a glass lens.

Equation (4) defines the ratio between the focal length of the positive part group and the focal length of the entire lens system at the telephoto end. More specifically, when fgis/fT is below 0.3, the motion compensation coefficient of the positive part group that is the stabilization group becomes small, and the shift amount necessary to keep a camera steady (to compensate image fluctuations), which is not preferable for a reduction in size. On the other hand, when the value of fgis/fT exceeds 1.2, the positive power of the positive part group that is the stabilization group becomes too strong, and the amount of the field fluctuation in keeping a camera steady becomes too large, which is not preferable.

Preferably, a zoom lens according to an embodiment of the invention is a lens whose core is aligned in fabricating the negative part group in the last lens group. The negative part group is suitable for compensating the field difference (partial blur) in each quadrant because great field fluctuations are generated without generating chromatic aberration when shifted in the direction vertical to the optical axis. Therefore, it is possible to fabricate a stabilized zoom lens having stable imaging performance.

Desirably, in a zoom lens according to an embodiment of the invention, the last lens group is fixed when magnification is varied. The last lens group is not suited to move in the direction of the optical axis because it has the stabilization group (positive part group) movable in the direction vertical to the optical axis and has a core aligned lens group (negative part group) movable in the direction vertical to the optical axis. Even though it is configured to be movable, its drive mechanism is increased in size.

Desirably, a zoom lens according to an embodiment of the invention is configured of a first lens group which has fixed positive refractive power when magnification is varied; a second lens group which has negative refractive power and moves on the optical axis to perform magnification varying operation; a third lens group which has fixed positive refractive power when magnification is varied; a fourth lens group which has positive refractive power and moves on the optical axis so as to keep the field position at a constant position, the field position fluctuates caused by moving the second lens group and a subject position; and a fifth lens group which has positive or negative refractive power as a last lens group, which are in turn positioned from on the object side, wherein the first lens group is configured of a single lens which is in turn positioned from on the object side and has the negative refractive power, a reflective member which bends the optical path, and a lens which has positive refractive power. With this configuration, a stabilized zoom lens can be fabricated which can achieve both the provision of high power and a reduction in size. In addition, for the reflective member, a prism with a higher refractive index is desirable. The higher the refractive index is, more advantageous are a reduction in size and the provision of high power.

Desirably, a zoom lens according to an embodiment of the invention satisfies Equation (5) below, where T is the air interval between the negative part group and the positive part group in the last lens group, and fW is the focal length of the entire lens system at the wide angle end, and the equation is conditional.

$$0.1 < T/fW < 1.0 \quad (5)$$

Equation (5) defines the ratio between the air interval between the negative part group and the positive part group in the last lens group and the focal length of the entire lens system at the wide angle end. More specifically, when the value of T/fW is below 0.1, the negative part group and the positive part group interfere with each other in keeping a camera steady, which is not preferable in the configuration. On the other hand, when the value of T/fW exceeds 1.0, the motion compensation coefficient is too small, and then it is difficult to secure a sufficient amount of compensation in keeping a camera steady, or the stabilization group (positive part group) is increased in size, which causes a difficulty of reduction in size. Moreover, most preferably, 0.2<T/fW<0.7 is satisfied. In this case, the motion compensation coefficient, the amount of motion necessary in keeping a camera steady, and image forming performance in keeping a camera steady are all satisfied.

Next, some forms of the zoom lens according to an embodiment of the invention and numeric examples in which specific numeric values are adapted to the embodiment will be described with reference to the drawings and tables.

In addition, in the embodiment, the aspheric surface is taken. The shape of the aspheric surface is defined by Equation 1 below, where x is the distance in the direction of the optical axis from the vertex on the lens surface, y is the height in the direction vertical to the optical axis, c is the paraxial curvature near at the lens vertex, K is the conic constant, and $A^i$ is the aspheric surface coefficient of the order i.

$$x = \frac{y^2 \cdot c^2}{1 + \sqrt{1 - (1+K) \cdot y^2 \cdot c^2}} + \sum A^i \cdot y^i \quad \text{Equation 6}$$

FIG. 1 shows a diagram depicting the lens configuration of a zoom lens according to a first embodiment of the invention. A zoom lens 1 is configured to in turn arrange from the object side, a first lens group GR1 having positive refractive power, a second lens group GR2 having negative refractive power, a third lens group GR3 having positive refractive power, a fourth lens group GR4 having positive refractive power, and a fifth lens group GR5 having negative refractive power. In changing the lens position from the short focal length end to the long focal length end, the first lens group GR1, the third lens group GR3 and the fifth lens group GR5 are fixed in the direction of the optical axis, and the second lens group GR2 and the fourth lens group GR4 are moved on the optical axis as indicated by dotted arrows in FIG. 1. In addition, the fourth lens group GR4 is moved in the direction of the optical axis in near distance focusing.

The first lens group GR1 is configured of a negative lens L11, a rectangular prism L12 which bends the optical axis at an angle of 90°, and a positive lens L13 which has an aspheric surface on both sides, which are in turn positioned from on the object side.

The second lens group GR2 is configured of a negative lens L21, a cemented lens L22 which is formed of a negative lens and a positive lens, and a negative lens L23, which are in turn positioned from on the object side. The third lens group GR3 is configured of a positive lens L3 which has an aspheric surface on both sides. The fourth lens group GR4 is configured of a cemented lens L4 which is formed of a positive lens and a negative lens, having an aspheric surface on the object side, which are in turn positioned from on the object side. The fifth lens group GR5 is configured of a negative meniscus lens L51 whose convex surface faces on the object side, and a positive lens L52 in a double-convex shape, which are in turn positioned from on the object side. The positive part group L52 in the fifth lens group (last lens group) is shifted in the direction orthogonal in the direction of the optical axis so as to compensate image fluctuations caused by motion such as camera shakes by hand. In addition, an aperture stop S is positioned near on the field side of the third lens group GR3, which is fixed in the direction of the optical axis when magnification is varied.

Table 1 shows lens data of a numeric example 1 which specific numeric values are adapted to the first embodiment 1. In the table which shows lens data of the numeric example 1 and numeric examples, described later, "i" denotes the ith optical surface from the object side, "ri" denotes the radius of the paraxial curvature of the ith surface from the object side, "di" denotes the axial spacing between the ith optical surface from the object side and the i+1st optical surface, "ni" denotes the refractive index for the d line (λ=587.6 nm) of a glass lens material having the ith optical surface on the object side, and "vi" denotes the Abbe number for the d line of the glass lens material having the ith optical surface on the object side. With regard to "ri", "INF" indicates that the optical surface of interest is a plane, and with regard to "di", "variable" indicates that the axial spacing of interest is variable spacing.

In addition, f indicates the focal length, FNO indicates the F number, and ω indicates a half angle of view.

TABLE 1

| f | | |
|---|---|---|
| 1.00 | 2.145 | 4.600 |
| F No. | | |
| 3.53 | 3.72 | 4.36 |
| ω | | |
| 31.85 | 15.21 | 7.19 |

| i | ri | di | ni | vi |
|---|---|---|---|---|
| 1 | 4.521 | 0.108 | 1.92286 | 20.9 |
| 2 | 1.864 | 0.366 | | |
| 3 | INF | 1.566 | 1.90366 | 31.3 |
| 4 | INF | 0.033 | | |
| 5 | 2.435 | 0.377 | 1.69350 | 53.2 |
| 6 | −4.384 | variable | | |
| 7 | 3.917 | 0.072 | 1.90366 | 31.3 |
| 8 | 1.258 | 0.143 | | |
| 9 | −4.071 | 0.067 | 1.78590 | 43.9 |
| 10 | 2.209 | 0.166 | 1.94595 | 18.0 |
| 11 | −8.770 | 0.059 | | |
| 12 | −1.639 | 0.072 | 1.77250 | 49.6 |
| 13 | 11.711 | variable | | |
| 14 | 1.767 | 0.227 | 1.58313 | 59.5 |
| 15 | −4.524 | variable | | |
| 16 | 1.779 | 0.378 | 1.58313 | 59.5 |
| 17 | −0.989 | 0.072 | 1.80610 | 33.3 |
| 18 | −1.771 | variable | | |
| 19 | 4.865 | 0.072 | 2.00069 | 25.5 |
| 20 | 0.980 | 0.267 | | |
| 21 | 1.496 | 0.301 | 1.48749 | 70.4 |
| 22 | −19.570 | 1.086 | | |
| 23 | INF | 0.145 | 1.51680 | 64.2 |
| 24 | INF | 0.133 | | |
| IMG | INF | 0.000 | | |

In changing the lens position from the short focal length end to the long focal length end, the following is varied: an axial spacing d6 between the first lens group GR1 and the second lens group GR2, an axial spacing d13 between the second lens group GR2 and the third lens group GR3, an axial spacing d15 between the third lens group GR3 and the fourth lens group GR4, and an axial spacing d18 between the fourth lens group GR4 and the fifth lens group GR5. Table 2 shows the values of the short focal length end (f=1.000), the medium focal length (f=2.145) and the long focal length end (f=4.600) of each of the variable spacings in the numeric example 1.

TABLE 2

| | f | | |
|---|---|---|---|
| | 1.000 | 2.145 | 4.600 |
| d6 | 0.131 | 1.166 | 1.825 |
| d13 | 1.739 | 0.703 | 0.044 |
| d15 | 1.500 | 1.055 | 0.563 |
| d18 | 0.299 | 0.744 | 1.236 |

A fifth surface (R5), a sixth surface (R6), a 14th surface (R14), a 15th surface (R15) and a 16th surface (R16) are configured of an aspheric surface. Table 3 shows the aspheric surface coefficients of the aspheric surfaces of the order 4, 6, 8, and 10 in the numeric example 1 along with the conic constant K.

In addition, in Table 3 and tables below showing the aspheric surface coefficients, "E-i" denotes the exponential notation using base 10, that is, "$10^{-i}$". For example, "0.12345E-05" expresses "$0.12345 \times 10^{-5}$".

TABLE 3

| i | K | $A^4$ | $A^6$ | $A^8$ | $A^{10}$ |
|---|---|---|---|---|---|
| 5 | 0.000E+00 | −1.733E−02 | 1.274E−02 | −1.906E−02 | 1.215E−02 |
| 6 | 0.000E+00 | −8.574E−03 | 1.562E−02 | −2.047E−02 | 1.297E−02 |
| 14 | 0.000E+00 | 1.126E−02 | 2.681E−01 | −3.200E−01 | 2.668E+00 |
| 15 | 0.000E+00 | 6.765E−02 | 3.149E−01 | −5.333E−01 | 3.479E+00 |
| 16 | 0.000E+00 | −6.602E−02 | 8.112E−02 | −2.812E−01 | 4.830E−01 |

FIGS. 2 to 6 show aberration diagrams in the infinity focusing state in the numeric example 1. FIG. 2 shows the longitudinal aberrations (spherical aberration, astigmatism, and distortion) at the short focal length end (f=1.000), FIG. 3 shows the longitudinal aberrations (spherical aberration, astigmatism, and distortion) at the medium focal length (f=2.145), and FIG. 4 shows the longitudinal aberrations (spherical aberration, astigmatism, and distortion) at the long focal length end (f=4.600). In addition, in FIGS. 2 to 4, in the spherical aberration, the vertical axis is the ratio to the full F value, and defocus is on the horizontal axis, showing the spherical aberration at the d line. In the astigmatism, the vertical axis is the image height, the horizontal axis is focus, a solid line is sagittal, and a dotted line is the meridional field. In the distortion, the vertical axis is the image height, and the horizontal axis is indicated by %.

Figure 6:
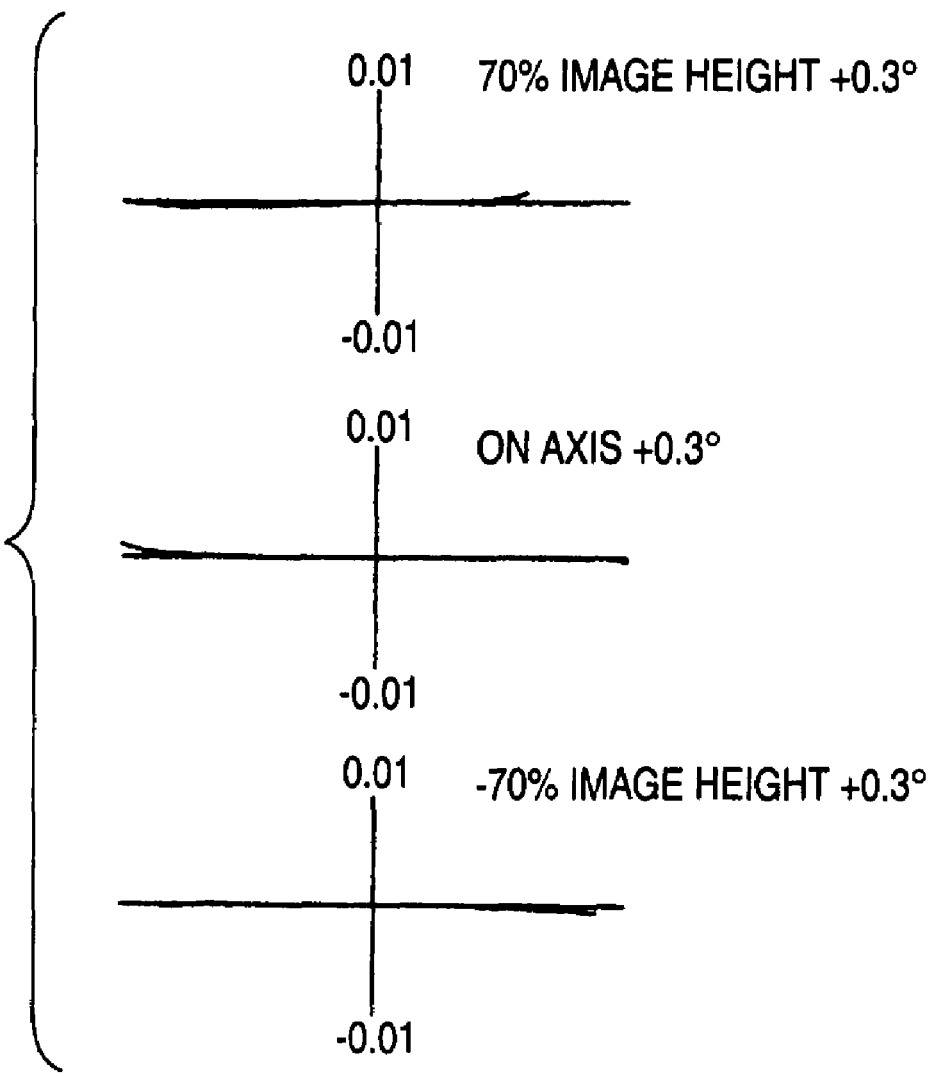
FIG. 6 shows transverse aberrations at the long focal length end, showing from above, when image fluctuations are compensated in 70% image height at an angle of 0.3°, when image fluctuations are compensated at the axial center at an angle of 0.3°, and when image fluctuations are compensated in −70% image height at an angle of 0.3°.

In addition, FIG. 5 shows transverse aberrations at the short focal length end, showing from above, when image fluctuations are compensated in 70% image height at an angle of 0.3°, when image fluctuations are compensated at the axial center at an angle of 0.3°, and when image fluctuations are compensated in −70% image height at an angle of 0.3°. FIG. 6 shows transverse aberrations at the long focal length end, showing from above, when image fluctuations are compensated in 70% image height at an angle of 0.3°, when image fluctuations are compensated at the axial center at an angle of 0.3°, and when image fluctuations are compensated in −70% image height at an angle of 0.3°.

Figure 7:
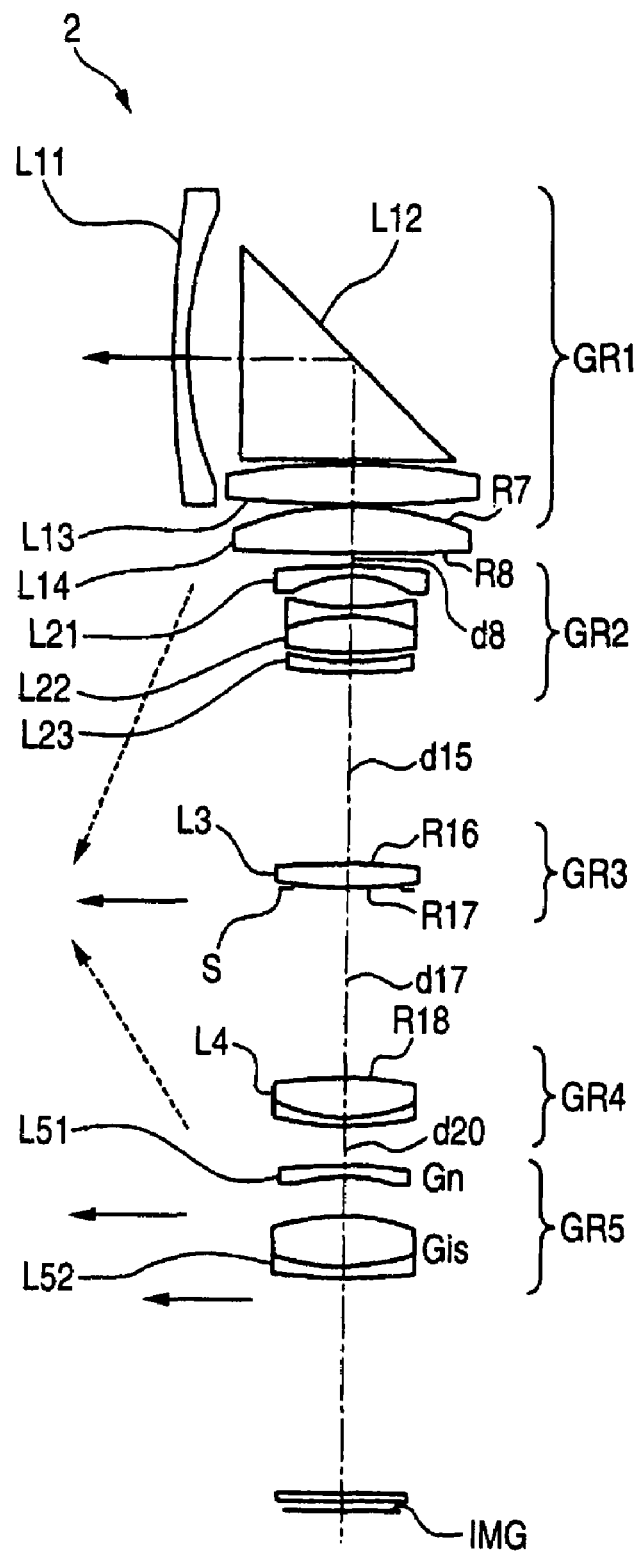
FIG. 7 shows a diagram depicting the lens configuration of a zoom lens according to a second embodiment of the invention.

FIG. 7 shows a diagram depicting the lens configuration of a zoom lens according to a second embodiment of the invention. A zoom lens 2 is configured to in turn arrange from the object side, a first lens group GR1 having positive refractive power, a second lens group GR2 having negative refractive power, a third lens group GR3 having positive refractive power, a fourth lens group GR4 having positive refractive power, and a fifth lens group GR5 having negative refractive power. In changing the lens position from the short focal length end to the long focal length end, the first lens group GR1, the third lens group GR3 and the fifth lens group GR5 are fixed in the direction of the optical axis, and the second lens group GR2 and the fourth lens group GR4 are moved on the optical axis as indicated by dotted arrows in FIG. 7. In addition, the fourth lens group GR4 is moved in the direction of the optical axis in near distance focusing.

The first lens group GR1 is configured of a negative lens L11, a rectangular prism L12 which bends the optical axis at an angle of 90°, a positive lens L13 which has an aspheric surface on both sides, and a positive lens L14, which are in turn positioned from on the object side. The second lens group GR2 is configured of a negative lens L21, a cemented lens L22 which is formed of a negative lens and a positive lens, and a negative lens L23, which are in turn positioned from on the object side. The third lens group GR3 is configured of a positive lens L3 which has an aspheric surface on both sides. The fourth lens group GR4 is configured of a cemented lens L4 which is formed of a positive lens and a negative lens, having an aspheric surface on the object side, which are in turn positioned from on the object side. The fifth lens group GR5 is configured of a negative meniscus lens L51 whose convex surface faces on the object side, and a cemented positive lens L52 which is of a positive lens and a negative lens, which are in turn positioned from on the object side. The positive part group L52 in the fifth lens group (last lens group) is shifted in the direction orthogonal in the direction of the optical axis so as to compensate image fluctuations caused by motion such as camera shakes by hand. In addition, an aperture stop S is positioned near on the field side of the third lens group GR3, which is fixed in the direction of the optical axis when magnification is varied.

Table 4 shows lens data of a numeric example 2 which specific numeric values are adapted to the second embodiment 2.

TABLE 4

| | | f | | | |
|---|---|---|---|---|---|
| | | 1.00 | 2.37 | 5.60 | |
| | | | F No. | | |
| | | 3.66 | 4.05 | 4.74 | |
| | | | ω | | |
| | | 34.47 | 15.08 | 6.49 | |
| 1 | | 9.774 | 0.118 | 1.92286 | 20.9 |
| 2 | | 3.014 | 0.445 | | |
| 3 | | INF | 1.891 | 1.90366 | 31.3 |
| 4 | | INF | 0.036 | | |
| 5 | | 5.443 | 0.337 | 1.61800 | 63.4 |
| 6 | | −8.819 | 0.018 | | |
| 7 | | 2.572 | 0.394 | 1.58313 | 59.5 |

TABLE 4-continued

| | f | | |
|---|---|---|---|
| | 1.00 | 2.37 | 5.60 |
| | | F No. | |
| | 3.66 | 4.05 | 4.74 |
| | | ω | |
| | 34.47 | 15.08 | 6.49 |

| | | | | |
|---|---|---|---|---|
| 8 | −22.071 | variable | | |
| 9 | 4.210 | 0.078 | 1.90366 | 31.3 |
| 10 | 1.044 | 0.254 | | |
| 11 | −2.311 | 0.073 | 1.82730 | 38.7 |
| 12 | 1.377 | 0.301 | 1.94595 | 18.0 |
| 13 | −4.538 | 0.090 | | |
| 14 | −1.600 | 0.078 | 1.90366 | 31.3 |
| 15 | −8.424 | variable | | |
| 16 | 3.721 | 0.190 | 1.76802 | 49.2 |

TABLE 4-continued

| | f | | |
|---|---|---|---|
| | 1.00 | 2.37 | 5.60 |
| | | F No. | |
| | 3.66 | 4.05 | 4.74 |
| | | ω | |
| | 34.47 | 15.08 | 6.49 |

| | | | | |
|---|---|---|---|---|
| 17 | −4.342 | variable | | |
| 18 | 2.900 | 0.315 | 1.62263 | 58.2 |
| 19 | −1.421 | 0.082 | 1.84552 | 23.0 |
| 20 | −2.234 | variable | | |
| 21 | 4.710 | 0.078 | 1.95000 | 27.0 |
| 22 | 1.325 | 0.364 | | |
| 23 | 1.959 | 0.412 | 1.51680 | 64.2 |
| 24 | −1.911 | 0.085 | 1.83648 | 36.7 |
| 25 | −3.607 | 1.818 | | |
| 26 | INF | 0.055 | 1.51680 | 64.2 |
| 27 | INF | 0.145 | | |
| IMG | INF | 0.000 | | |

In changing the lens position from the short focal length end to the long focal length end, the following is varied: an axial spacing d8 between the first lens group GR1 and the second lens group GR2, an axial spacing d15 between the second lens group GR2 and the third lens group GR3, an axial spacing d17 between the third lens group GR3 and the fourth lens group GR4, and an axial spacing d20 between the fourth lens group GR4 and the fifth lens group GR5. Table 5 shows the values of the short focal length end (f=1.00), the medium focal length (f=2.37) and the long focal length end (f=5.60) of each of the variable spacings in the numeric example 2.

TABLE 5

| | f | | |
|---|---|---|---|
| | 1.000 | 2.37 | 5.60 |
| d8 | 0.11 | 1.01 | 1.63 |
| d15 | 1.64 | 0.73 | 0.12 |
| d17 | 1.63 | 1.04 | 0.53 |
| d20 | 0.32 | 0.91 | 1.41 |

A seventh surface (R7), an eighth surface (R8), a 16th surface (R16), a 17th surface (R17) and an 18th surface (R18) are configured of an aspheric surface. Table 6 shows the aspheric surface coefficients of the aspheric surfaces of the order 4, 6, 8, and 10 in the numeric example 2 along with the conic constant K.

TABLE 6

| i | K | $A^4$ | $A^6$ | $A^8$ | $A^{10}$ |
|---|---|---|---|---|---|
| 7 | 0.000E+00 | −4.751E−03 | −5.877E−04 | 1.142E−03 | −1.469E−03 |
| 8 | 0.000E+00 | −2.924E−03 | 2.651E−03 | −1.941E−03 | −1.833E−04 |
| 16 | 0.000E+00 | −2.597E−02 | 8.521E−03 | 7.454E−02 | −1.856E−01 |
| 17 | 0.000E+00 | 3.906E−04 | −5.013E−03 | 1.433E−01 | −3.068E−01 |
| 18 | 0.000E+00 | −3.392E−02 | 6.077E−02 | −1.983E−01 | 2.478E−01 |

FIGS. 8 to 12 show aberration diagrams in the infinity focusing state in the numeric example 2. FIG. 8 shows the longitudinal aberrations (spherical aberration, astigmatism, and distortion) at the short focal length end (f=1.00), FIG. 9 shows the longitudinal aberrations (spherical aberration, astigmatism, and distortion) at the medium focal length (f=2.37), and FIG. 10 shows the longitudinal aberrations (spherical aberration, astigmatism, and distortion) at the long focal length end (f=5.60). In addition, in FIGS. 8 to 10, in the spherical aberration, the vertical axis is the ratio to the full F value, and defocus is on the horizontal axis, showing the spherical aberration at the d line. In the astigmatism, the vertical axis is the image height, the horizontal axis is focus, a solid line is sagittal, and a dotted line is the meridional field. In the distortion, the vertical axis is the image height, and the horizontal axis is indicated by %.

Figure 12:
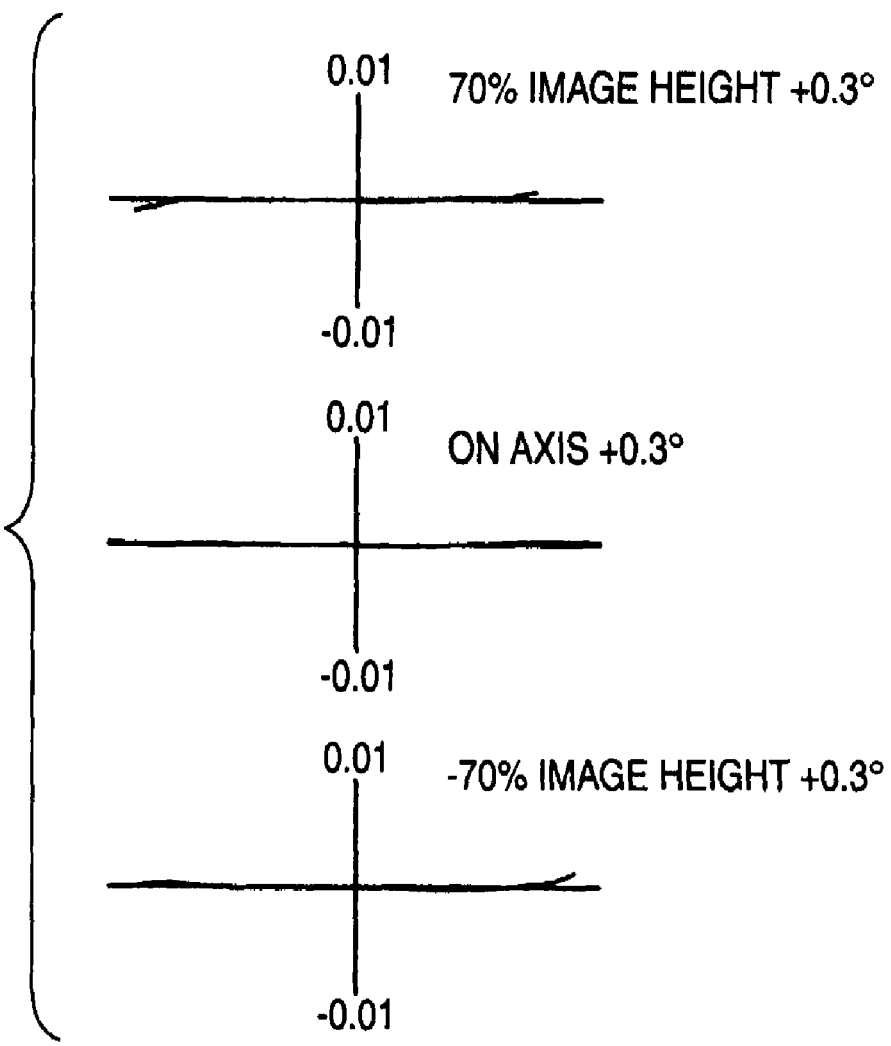
FIG. 12 shows transverse aberrations at the long focal length end, showing from above, when image fluctuations are compensated in 70% image height at an angle of 0.3°, when image fluctuations are compensated at the axial center at an angle of 0.3°, and when image fluctuations are compensated in −70% image height at an angle of 0.3°.

In addition, FIG. 11 shows transverse aberrations at the short focal length end, showing from above, when image fluctuations are compensated in 70% image height at an angle of 0.3°, when image fluctuations are compensated at the axial center at an angle of 0.3°, and when image fluctuations are compensated in −70% image height at an angle of 0.3°. FIG. 12 shows transverse aberrations at the long focal length end, showing from above, when image fluctuations are compensated in 70% image height at an angle of 0.3°, when image fluctuations are compensated at the axial center at an angle of 0.3°, and when image fluctuations are compensated in −70% image height at an angle of 0.3°.

Figure 13:
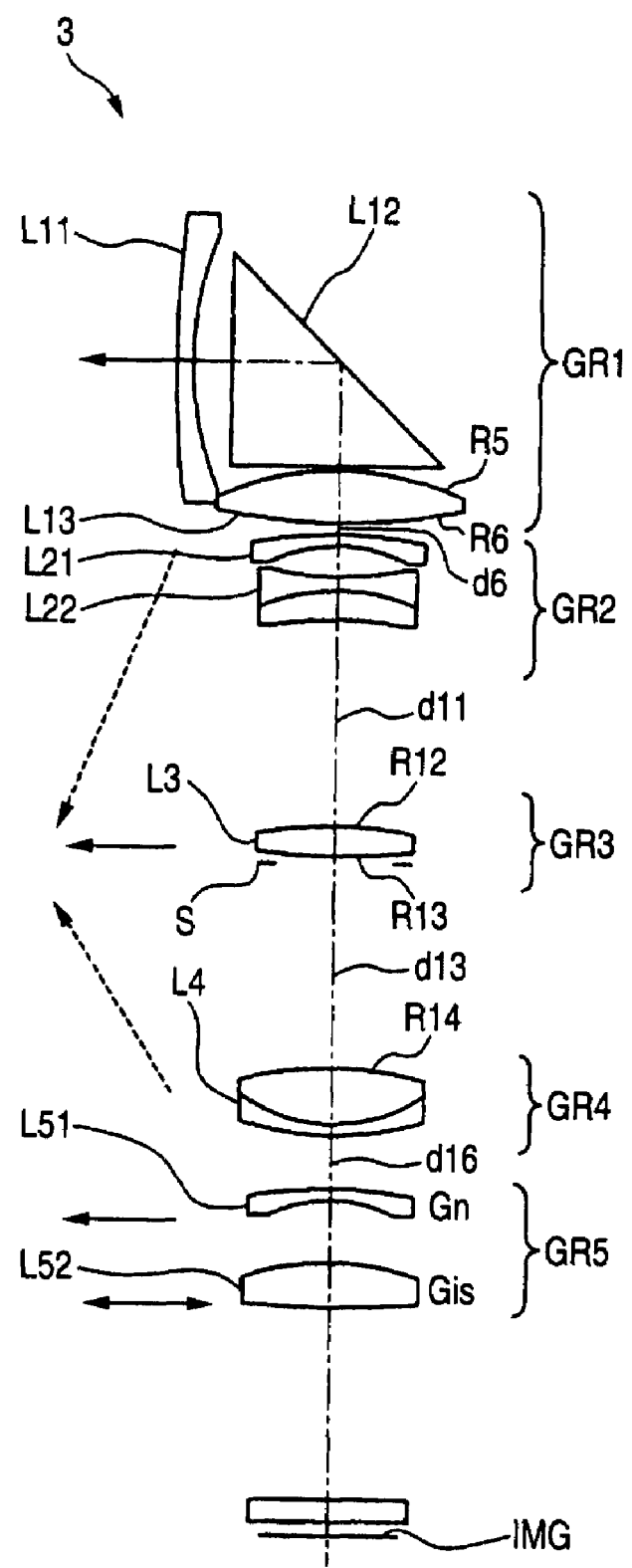
FIG. 13 shows a diagram depicting the lens configuration of a zoom lens according to a third embodiment of the invention.

FIG. 13 shows a diagram depicting the lens configuration of a zoom lens according to a third embodiment of the invention. A zoom lens 3 is configured to in turn arrange from the object side, a first lens group GR1 having positive refractive power, a second lens group GR2 having negative refractive power, a third lens group GR3 having positive refractive power, a fourth lens group GR4 having positive refractive power, and a fifth lens group GR5 having negative refractive power. In changing the lens position from the short focal length end to the long focal length end, the first lens group GR1, the third lens group GR3 and the fifth lens group GR5 are fixed in the direction of the optical axis, and the second lens group GR2 and the fourth lens group GR4 are moved on the optical axis as shown by dotted arrows in FIG. 13. In addition, the fourth lens group GR4 is moved in the direction of the optical axis in near distance focusing.

The first lens group GR1 is configured of a negative lens L11, a rectangular prism L12 which bends the optical axis at an angle of 90°, and a positive lens L13 which has an aspheric surface on both sides, which are in turn positioned from on the object side. The second lens group GR2 is configured of a negative lens L21, and a cemented lens L22 which is formed of a negative lens and a positive lens, which are in turn positioned from on the object side. The third lens group GR3 is configured of a positive lens L3 which has an aspheric surface on both sides. The fourth lens group GR4 is configured of a cemented lens L4 which is formed of a positive lens and a negative lens, having an aspheric surface on the object side, which are in turn positioned from on the object side. The fifth lens group GR5 is configured of a negative meniscus lens L51 whose convex surface faces on the object side, and a cemented positive lens L52 which is of a positive lens and a negative lens, which are in turn positioned from on the object side. The positive part group L52 in the fifth lens group (last lens group) is shifted in the direction orthogonal in the direction of the optical axis so as to compensate image fluctuations caused by motion such as camera shakes by hand. In addition, an aperture stop S is positioned near on the field side of the third lens group GR3, which is fixed in the direction of the optical axis when magnification is varied.

Table 7 shows lens data of a numeric example 3 which specific numeric values are adapted to the third embodiment 3.

TABLE 7

| | f | | |
|---|---|---|---|
| | 1.00 | 1.92 | 3.70 |
| | | F no. | |
| | 3.64 | 3.94 | 4.67 |
| | | ω | |
| | 32.25 | 17.03 | 8.95 |
| i | ri | di | ni | vi |
| 1 | 9.951 | 0.100 | 1.92286 | 20.9 |
| 2 | 2.270 | 0.250 | | |
| 3 | INF | 1.366 | 1.90366 | 31.3 |
| 4 | INF | 0.033 | | |
| 5 | 2.201 | 0.318 | 1.76802 | 49.2 |
| 6 | −4.843 | variable | | |
| 7 | 3.606 | 0.72 | 1.88300 | 40.8 |
| 8 | 0.983 | 0.193 | | |

TABLE 7-continued

| | f | | |
|---|---|---|---|
| | 1.00 | 1.92 | 3.70 |
| | | F no. | |
| | 3.64 | 3.94 | 4.67 |
| | | ω | |
| | 32.25 | 17.03 | 8.95 |
| i | ri | di | ni | vi |
| 9 | −1.584 | 0.072 | 1.73808 | 42.1 |
| 10 | 1.212 | 0.199 | 1.92286 | 20.9 |
| 11 | 7.458 | variable | | |
| 12 | 1.989 | 0.171 | 1.76802 | 49.2 |
| 13 | −16.649 | variable | | |
| 14 | 2.011 | 0.358 | 1.61881 | 63.9 |
| 15 | −1.027 | 0.075 | 1.90366 | 31.3 |
| 16 | −1.887 | variable | | |
| 17 | 2.498 | 0.075 | 2.00069 | 25.5 |
| 18 | 0.999 | 0.401 | | |
| 19 | 1.595 | 0.274 | 1.48749 | 70.4 |
| 20 | −6.673 | 1.230 | | |
| 21 | INF | 0.133 | 1.51680 | 64.2 |
| 22 | INF | 0.133 | | |
| IMG | INF | | | |

In changing the lens position from the short focal length end to the long focal length end, the following is varied: an axial spacing d6 between the first lens group GR1 and the second lens group GR2, an axial spacing d11 between the second lens group GR2 and the third lens group GR3, an axial spacing d13 between the third lens group GR3 and the fourth lens group GR4, and an axial spacing d16 between the fourth lens group GR4 and the fifth lens group GR5. Table 5 shows the values of the short focal length end (f=1.00), the medium focal length (f=1.92) and the long focal length end (f=3.70) of each of the variable spacings in the numeric example 3.

TABLE 8

| | f | | |
|---|---|---|---|
| | 1.00 | 1.92 | 3.70 |
| d6 | 0.09 | 0.82 | 1.32 |
| d11 | 1.32 | 0.59 | 0.10 |
| d13 | 1.35 | 0.92 | 0.42 |
| d16 | 0.33 | 0.76 | 1.26 |

A fifth surface (R5), a sixth surface (R6), a 12th surface (R12), a 13th surface (R13) and a 14th surface (R14) are configured of an aspheric surface.

Table 9 shows the aspheric surface coefficients of the aspheric surfaces of the order 4, 6, 8, and 10 in the numeric example 3 are shown along with the conic constant K.

TABLE 9

| i | K | $A^4$ | $A^6$ | $A^8$ | $A^{10}$ |
|---|---|---|---|---|---|
| 5 | 0.000E+00 | −2.369E−02 | 2.893E−02 | −2.535E−02 | −1.045E−02 |
| 6 | 0.000E+00 | −9.173E−03 | 4.693E−02 | −6.136E−02 | 1.457E−02 |
| 12 | 0.000E+00 | 6.826E−04 | −9.303E−02 | 4.268E−01 | −9.626E−01 |
| 13 | 0.000E+00 | 3.949E−02 | −8.812E−02 | 4.240E−01 | −1.013E+00 |
| 14 | 0.000E+00 | −4.382E−02 | 5.008E−02 | −1.429E−01 | 2.057E−01 |

Figure 14:
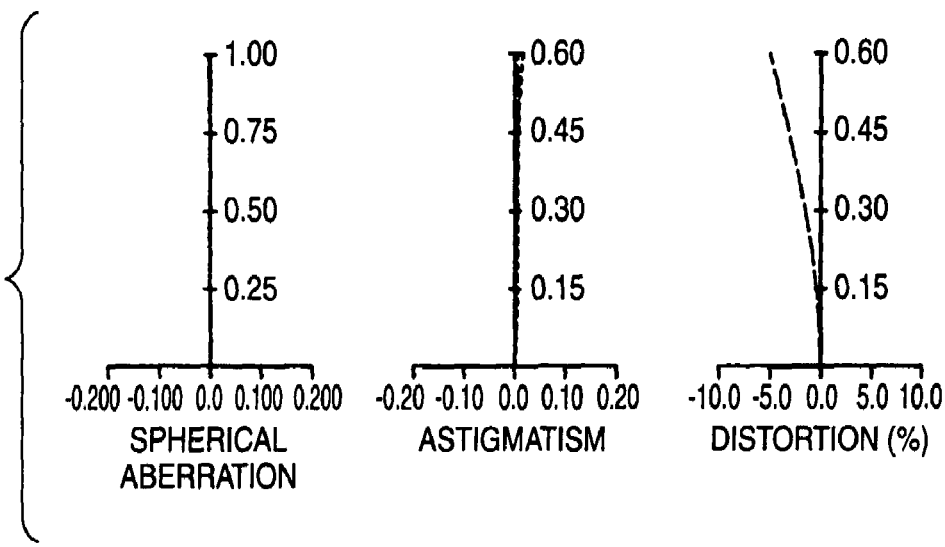
FIG. 14 shows diagrams depicting various aberrations of a numeric example 3 in which specific numeric values are adapted to the zoom lens according to the third embodiment of the invention, showing longitudinal aberrations (spherical aberration, astigmatism, and distortion) at a short focal length end along with FIGS. 15 to 18.
Figure 15:
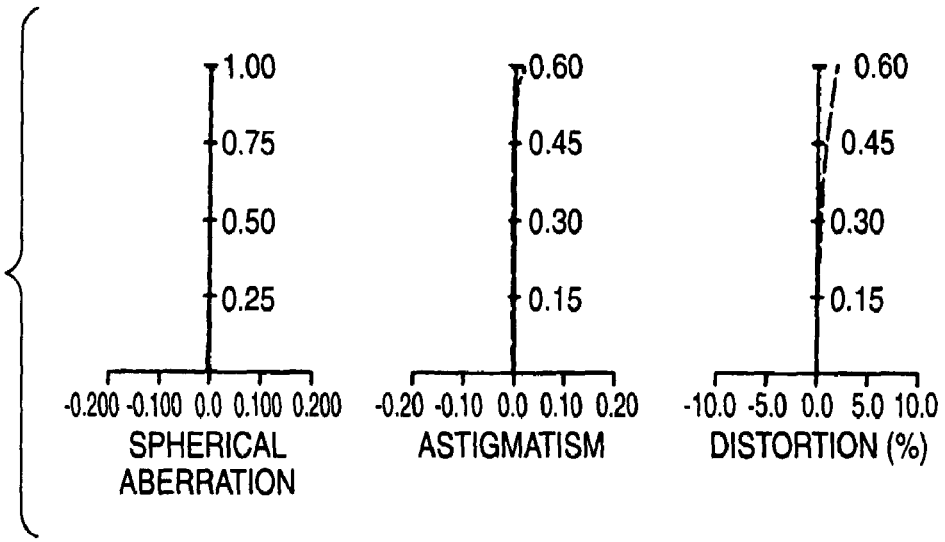
FIG. 15 shows diagrams depicting longitudinal aberrations (spherical aberration, astigmatism, and distortion) at a medium focal length.
Figure 16:
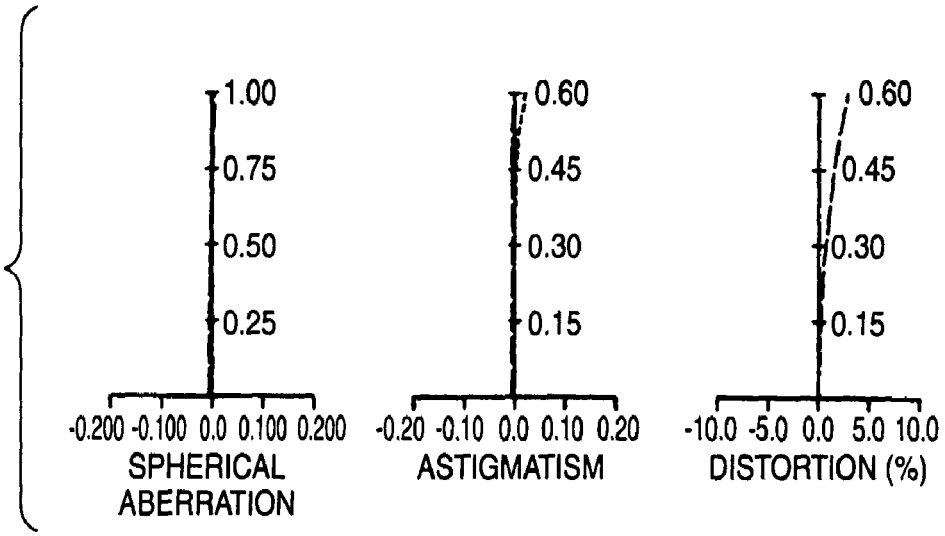
FIG. 16 shows diagrams depicting longitudinal aberrations (spherical aberration, astigmatism, and distortion) at a long focal length end.

FIGS. 14 to 18 show aberration diagrams in the infinity focusing state in the numeric example 3. FIG. 14 shows the longitudinal aberrations (spherical aberration, astigmatism, and distortion) at the short focal length end (f=1.00), FIG. 15 shows the longitudinal aberrations (spherical aberration, astigmatism, and distortion) at the medium focal length (f=1.92), and FIG. 16 shows the longitudinal aberrations (spherical aberration, astigmatism, and distortion) at the long focal length end (f=3.70). In addition, in FIGS. 14 to 16, in the spherical aberration, the vertical axis is the ratio to the full F value, and defocus is on the horizontal axis, showing the spherical aberration at the d line. In the astigmatism, the vertical axis is the image height, the horizontal axis is focus, a solid line is sagittal, and a dotted line is the meridional field. In the distortion, the vertical axis is the image height, and the horizontal axis is indicated by %.

Figure 17:
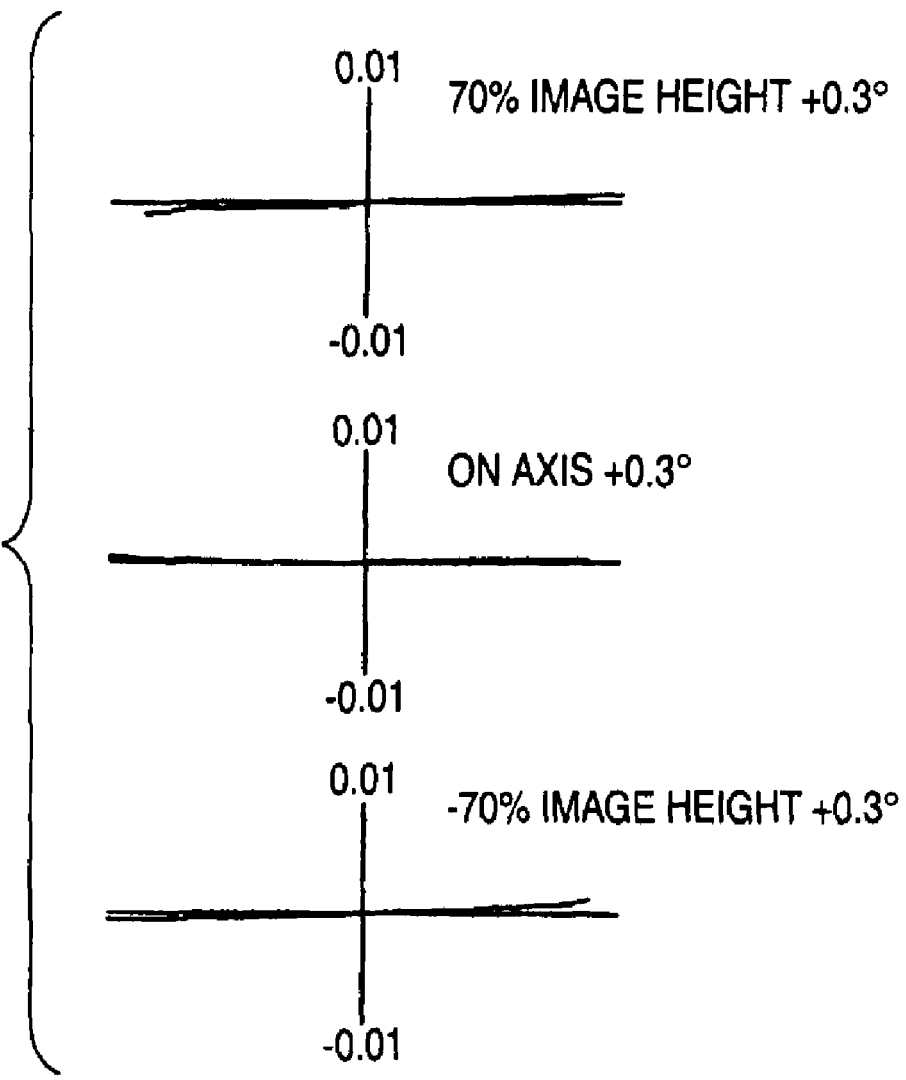
FIG. 17 shows diagrams depicting transverse aberrations at a short focal length end, showing from above, when image fluctuations are compensated in 70% image height at an angle of 0.3°, when image fluctuations are compensated at the axial center at an angle of 0.3°, and when image fluctuations are compensated in −70% image height at an angle of 0.3°.
Figure 18:
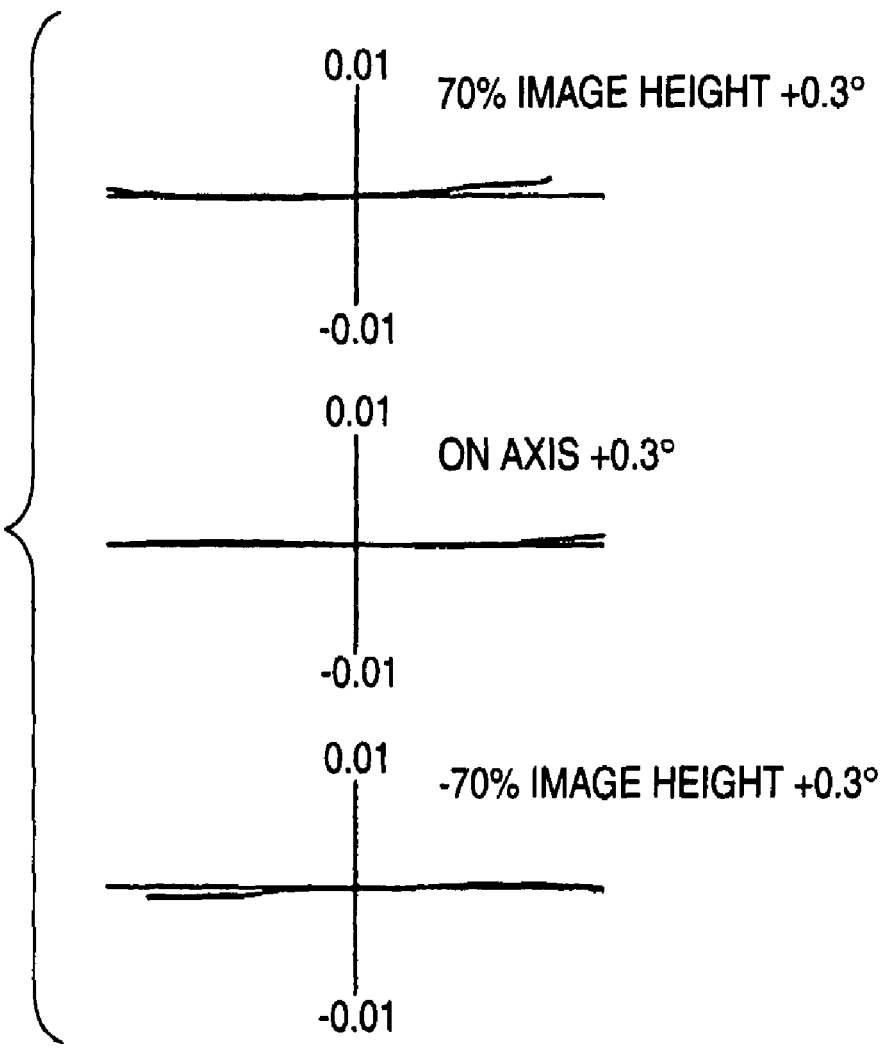
FIG. 18 shows transverse aberrations at the long focal length end, showing from above, when image fluctuations are compensated in 70% image height at an angle of 0.3°, when image fluctuations are compensated at the axial center at an angle of 0.3°, and when image fluctuations are compensated in −70% image height at an angle of 0.3°.

In addition, FIG. 17 shows transverse aberrations at the short focal length end, showing from above, when image fluctuations are compensated in 70% image height at an angle of 0.3°, when image fluctuations are compensated at the axial center at an angle of 0.3°, and when image fluctuations are compensated in −70% image height at an angle of 0.3°. FIG. 18 shows transverse aberrations at the long focal length end, showing from above, when image fluctuations are compensated in 70% image height at an angle of 0.3°, when image fluctuations are compensated at the axial center at an angle of 0.3°, and when image fluctuations are compensated in −70% image height at an angle of 0.3°.

Table 10 shows the numeric values and the values corresponding to the equations to determine the conditions for Equations (1) to (5) of the zoom lenses 1 to 3 shown in the numeric examples 1 to 3.

TABLE 10

|  | Numeric Example 1 | Numeric Example 2 | Numeric Example 3 |
| --- | --- | --- | --- |
| Equation (1) | −0.134 | −0.180 | −0.230 |
| Equation (2) | 44.900 | 100.047 | 44.900 |
| Equation (3) | 2.001 | 1.950 | 2.001 |
| Equation (4) | 0.623 | 0.554 | 0.721 |
| Equation (5) | 0.401 | 0.364 | 0.401 |

As also apparent from Table 10, the zoom lenses 1 to 3 of the numeric examples 1 to 3 satisfy Equations (1) to (5). In addition, as shown in the aberration diagrams, each aberration is compensated well balanced at the short focal length end, in the medium focal length between the short focal length end and the long focal length end, and at the long focal length end as well as in keeping a camera steady.

Next, an imaging apparatus according to an embodiment of the invention will be described.

An imaging apparatus according to an embodiment of the invention is an imaging apparatus including a zoom lens, and an imaging device which converts an optical image formed by the zoom lens into an electric signal, the imaging apparatus including: a camera shake detecting module operable to detect a motion of the imaging apparatus; a camera shake control module operable to compute a motion compensation angle for compensating image fluctuations caused by the motion of the imaging apparatus detected by the camera shake detecting module and to send a drive signal so that a shift lens group in the zoom lens is placed at a position based on the motion compensation angle; and a drive part operable to shift the shift lens group in a direction vertical to an optical axis based on the drive signal, wherein the zoom lens is configured of a plurality of lens groups to change a distance between lens groups to vary magnification, and a last lens group positioned on an image side closest thereto has a negative part group having negative refractive power and a positive part group arranged adjacent on the image side thereof and having positive refractive power, wherein the positive part group is shifted in a direction vertical to an optical axis to shift an image, Equations (1) and (2) are satisfied, where the equations are conditional, $$-0.30 < fgn/(Ngn \cdot fT) < -0.05 \quad (1)$$

$$vgn - vgis > 30 \quad (2),$$

and the positive part group in the last lens group of the zoom lens is the shift lens group. With the configuration above, the imaging apparatus according to an embodiment of the invention is configured in a small size to take pictures in a high magnification, and has a function of image stabilization.

Figure 19:
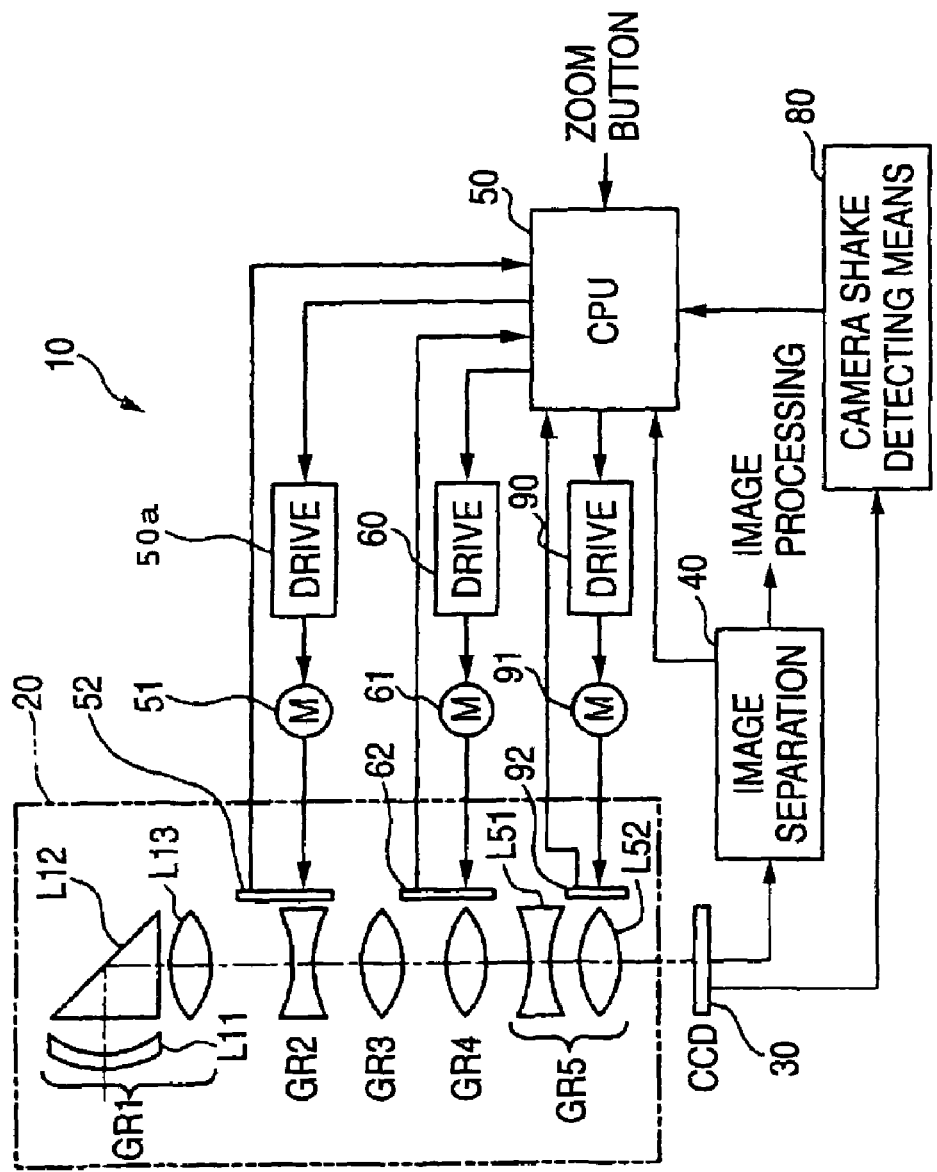
FIG. 19 shows a block diagram depicting an exemplary imaging apparatus according to an embodiment of the invention.

Next, a specific form of the imaging apparatus according to an embodiment of the invention will be described with reference to a block diagram shown in FIG. 19.

An imaging apparatus 10 has a zoom lens 20 and an imaging device 30 which converts an optical image taken by the zoom lens 20 into electric signals. In addition, for the imaging device 30, for example, those using a photoelectric conversion element such as a CCD (Charge Coupled Device) and a CMOS (Complementary Metal-Oxide Semiconductor) can be adapted. For the zoom lens 20, the zoom lens according to an embodiment of the invention can be adapted. In FIG. 19, the lens groups except the first lens group GR1 of the zoom lens 1 according to the first embodiment shown in FIG. 1 are illustrated as simplified by single lenses (each group of the fifth lens group GR5 is depicted by a single lens). Of course, not only the zoom lens 1 according to the first embodiment but also the zoom lens according to an embodiment of the invention may be used that are configured in forms other than the zoom lenses 2 and 3 according to the second embodiment and the third embodiment and the embodiments described in the specification.

In the electric signal generated by the imaging device 30, a focus control signal is sent to a control circuit (CPU) 50 by an image separation circuit 40, and an image signal is sent to an image processing circuit. The signal sent to the image processing circuit is processed in forms suitable for the subsequent processing for use in display by a display device, recording in a recording medium, transmission by a communication module, etc.

For example, to the control circuit 50, a manipulate signal such as the manipulation of a zoom button is externally inputted to perform various processes in response to the manipulate signal. For instance, when a zooming command is inputted by the zoom button, drive parts 51, 61 and 91 are operated through driver circuits 50a, 60 and 90 in order to turn the state into a focal length state based on the command, and each of the lens groups GR2 and GR4 are moved at predetermined positions. The position information of each of the lens groups GR2 and GR4 obtained by sensors 52, 62 and 92 is inputted to the control circuit (CPU) 50, which is referenced when a command signal is outputted to the driver circuits 60 and 90. In addition, the control circuit 50 checks the focus state based on the signal sent from the image separation circuit 40, and operates the drive part 61 through the driver circuit 60 to control the position of the fourth lens group GR4 so as to obtain the optimum focus state.

The imaging apparatus 10 has a function of image stabilization. For example, when a camera shake detecting module 80, such as a gyro sensor, which detects the motion of the imaging device 30 caused by pressing down a shutter release button, the signal from the camera shake detecting module 80 is inputted to the control circuit 50 to compute a motion compensation angle which compensates image fluctuations caused by the motion in the control circuit 50. In order to place the positive part group L52 (shift lens group) of the fifth lens group GR5 at the position based on the computed motion compensation angle, the drive part 91 is operated through the driver circuit 90 to move (shift) the positive part group L52 in the direction vertical to the optical axis. The position of the positive part group L52 is detected by a sensor 92, and position information of the positive part group L52 obtained by the sensor 92 is inputted to the control circuit 50, which is referenced when a command signal is sent to the driver circuit 90.

The imaging apparatus 10 described above can take various forms as specific products. For example, it can be widely adapted as a camera part of digital input/output devices such as a digital still camera, a digital video camera, a cellular telephone having a camera incorporated therein, and a PDA (Personal Digital Assistant) having a camera incorporated therein.

In addition, the specific forms and the numeric values of each component shown in the embodiments and the numeric examples illustrate only examples made in the implementation of the invention, the technical scope of the invention should not be interpreted in a limited manner because of these.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising a plurality of lens groups and varying magnification by changing a distance between the lens groups, wherein
   a last lens group which is positioned on an image side closest thereto and has a negative part group having negative refractive power and a positive part group arranged adjacent on the image side thereof and having positive refractive power,
   the positive part group is shifted in a direction vertical to an optical axis to shift an image, and
   Equations (1) and (2) are satisfied, where the equations are conditional, $$-0.30 < fgn/(Ngn \cdot fT) < -0.05 \quad (1)$$

$$vgn - vgis > 30 \quad (2)$$

where,
fgn: a focal length of the negative part group in the last lens group,
Ngn: an average refractive index of the negative part group in the last lens group,
fT: a focal length of the entire system at a telephoto end,
vgn: a composite Abbe number of the negative part group in the last lens group, and
vgis: a composite Abbe number of the positive part group in the last lens group.

2. The zoom lens according to claim 1, wherein the negative part group in the last lens group is configured of a negative meniscus single lens in which a convex surface faces on an object side having negative refractive power, which satisfies Equation (3) below, where the equation is conditional, $$Ngn > 1.80 \quad (3).$$

3. The zoom lens according to claim 1, wherein the positive part group in the last lens group is configured of a single lens or a single cemented lens having positive refractive power, which satisfies Equation (4) below, where the equation is conditional, $$0.3 < fgis/fT < 1.2 \quad (4)$$

where,
fgis: focal length of the positive part group in the last lens group.

4. The zoom lens according to claim 1, wherein the negative part group in the last lens group is a core aligned lens whose core is aligned in fabricating.

5. The zoom lens according to claim 1, wherein the last lens group is fixed when magnification is varied.

6. The zoom lens according to claim 1, further comprising:
   a first lens group which has fixed positive refractive power when magnification is varied;
   a second lens group which has negative refractive power, and which moves on an optical axis to perform magnification varying operation;
   a third lens group which has fixed positive refractive power when magnification is varied;
   a fourth lens group which has positive refractive power, and which moves on an optical axis so as to keep a field position at a constant position, the field position that fluctuates caused by motion of the second lens group and a subject position; and
   a fifth lens group which has positive or negative refractive power as the last lens group, the lens groups being positioned from an object side,
   wherein the first lens group is configured of a single lens having negative refractive power, a reflective member which bends an optical path, and a lens having positive refractive power, which are positioned from the object side.

7. An imaging apparatus comprising:
   a zoom lens; and
   an imaging device which converts an optical image formed by the zoom lens into an electric signal;
   camera shake detecting means operable to detect a motion of the imaging apparatus;
   camera shake control means operable to compute a motion compensation angle for compensating image fluctuations caused by the motion of the imaging apparatus detected by the camera shake detecting means and to send a drive signal so that a shift lens group in the zoom lens is placed at a position based on the motion compensation angle; and
   a drive part operable to shift the shift lens group in a direction vertical to an optical axis based on the drive signal,
   wherein the zoom lens is configured of a plurality of lens groups to change a distance between lens groups to vary magnification, and
   a last lens group positioned on an image side closest thereto has a negative part group having negative refractive power and a positive part group arranged adjacent on the image side thereof and having positive refractive power,
   wherein the positive part group is shifted in a direction vertical to an optical axis to shift an image,
   Equations (1) and (2) are satisfied, where the equations are conditional, $$-0.30 < fgn/(Ngn \cdot fT) < -0.05 \quad (1)$$

$$vgn - vgis > 30 \quad (2)$$

where, fgn: a focal length of the negative part group in the last lens group,

Ngn: an average refractive index of the negative part group in the last lens group, fT: a focal length of the entire system at a telephoto end, vgn: a composite Abbe number of the negative part group in the last lens group, and vgis: a composite Abbe number of the positive part group in the last lens group, and the positive part group in the last lens group of the zoom lens is the shift lens group.

8. An imaging apparatus comprising:

a zoom lens; and an imaging device which converts an optical image formed by the zoom lens into an electric signal;

a camera shake detecting module operable to detect a motion of the imaging apparatus;

a camera shake control module operable to compute a motion compensation angle for compensating image fluctuations caused by the motion of the imaging apparatus detected by the camera shake detecting module and to send a drive signal so that a shift lens group in the zoom lens is placed at a position based on the motion compensation angle; and a drive part operable to shift the shift lens group in a direction vertical to an optical axis based on the drive signal, wherein the zoom lens is configured of a plurality of lens groups to change a distance between lens groups to vary magnification, and a last lens group positioned on an image side closest thereto has a negative part group having negative refractive power and a positive part group arranged adjacent on the image side thereof and having positive refractive power, wherein the positive part group is shifted in a direction vertical to an optical axis to shift an image, Equations (1) and (2) are satisfied, where the equations are conditional, $$-0.30 < fgn/(Ngn \cdot fT) < -0.05 \qquad (1)$$

$$vgn - vgis > 30 \qquad (2)$$

where, fgn: a focal length of the negative part group in the last lens group,

Ngn: an average refractive index of the negative part group in the last lens group, fT: a focal length of the entire system at a telephoto end, vgn: a composite Abbe number of the negative part group in the last lens group, and vgis: a composite Abbe number of the positive part group in the last lens group, and the positive part group in the last lens group of the zoom lens is a shift lens group.

\* \* \* \* \*